May 27, 1941.    K. RABE    2,243,721
VEHICLE BODY
Filed Nov. 4, 1937    2 Sheets-Sheet 1
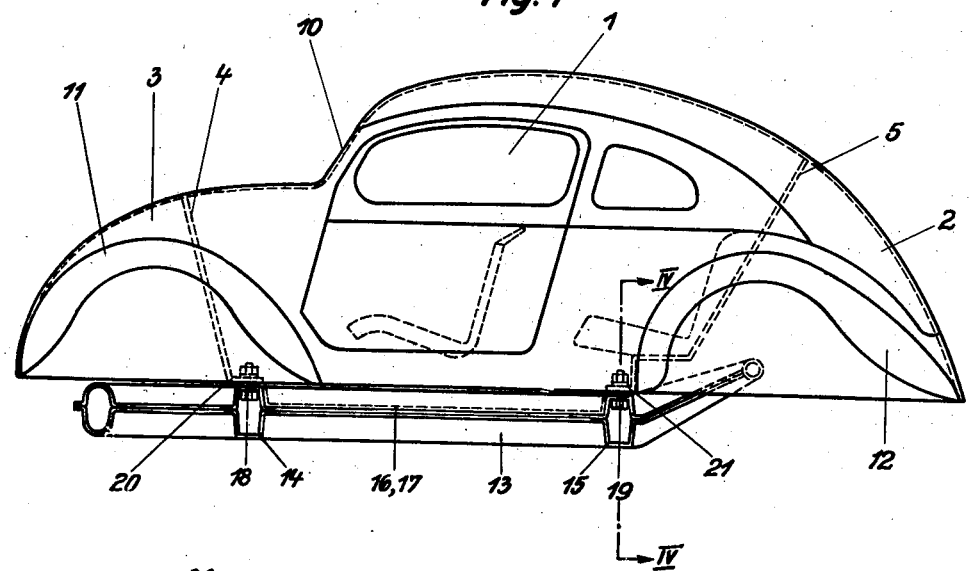
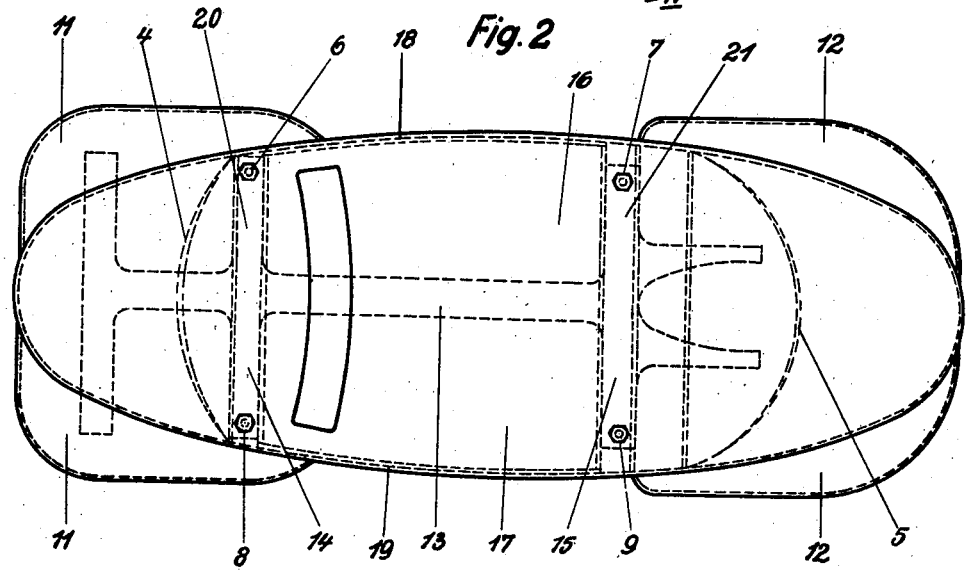
Inventor:
KARL RABE
By
Attorneys May 27, 1941.　　　　K. RABE　　　　2,243,721
VEHICLE BODY
Filed Nov. 4, 1937　　　　2 Sheets-Sheet 2

Inventor
KARL RABE
By
Attorneys

Patented May 27, 1941

2,243,721

UNITED STATES PATENT OFFICE 2,243,721

VEHICLE BODY

Karl Rabe, Stuttgart, Germany, assignor to Dr. ing. h. c. F. Porsche, K.-G., Stuttgart-Zuffenhausen, Germany, a company of Germany Application November 4, 1937, Serial No. 172,750
In Germany November 9, 1936

8 Claims. (Cl. 296—28)

This invention relates to vehicle bodies, and is particularly directed to a self-supporting body adapted for use with power vehicles.

An object of this invention is the provision of an improved vehicle body which combines a maximum of rigidity with an extremely low fabrication cost.

Another object of this invention is the provision of an integral self-supporting vehicle body.

Still another object of this invention is the provision of an integral self-supporting vehicle body having integral transverse supporting members forming partitions within the body.

A further object of this invention is the provision of an improved vehicle wherein a self-supporting unitary vehicle body is attached to the transverse members of the vehicle frame.

An additional object of this invention is the provision of an improved vehicle wherein the vehicle body is unaffected by the twisting of the longitudinal vehicle frame members.

A still further object of this invention is the provision of an improved vehicle in which the vehicle body may be mounted upon and removed from the vehicle frame with greatest possible ease and in an extremely short space of time.

These and other features of the invention will be best understood and appreciated from the following description of a preferred embodiment thereof, described for purposes of illustration and shown in the accompanying drawing in which:

Fig. 1 is a side view of the improved vehicle body according to this invention;

Fig. 2 is a top view of the vehicle body illustrated in Fig. 1;

Figure 3:
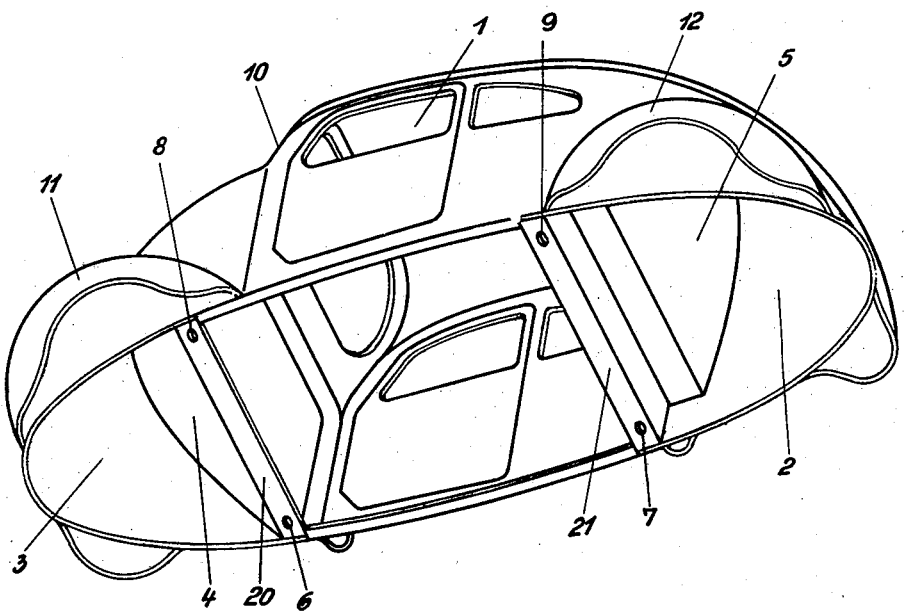
Fig. 3 is a perspective view of the same body as seen from the side and bottom.

As shown in Figs. 1, 2 and 3 a preferred form of streamlined vehicle body according to this invention is formed in the shape of a hollow, self-supporting body, open at the bottom. The body is shown interiorly divided into three compartments, the passenger compartment 1, the motor compartment 2 and the baggage compartment 3. The latter may be built to hold an extra vehicle wheel as well as baggage. It will thus be seen that the unitary body formed according to this invention comprehends the entire vehicle space and additional room, such as a hood, for the engine or luggage is unnecessary.

The vehicle body is divided into the three compartments recited above by means of two transverse partitions 4 and 5, which at the same time form the sole transverse body stiffening means. In addition, the transverse wall 5 may be so constructed as to form the bottom and back supports for the rear seats of the vehicle. The front seats are adapted to be attached to the floor plates 16 and 17 in any suitable manner.

My improved vehicle body above described is adapted for use with any vehicle frame structure used in the art, which includes at least one longitudinal beam and two more transverse beams, such, for example, as illustrated in Figs. 3, 4, 5a, and 8 of the U. S. Patent 2,133,633 to Rabe and Boxan, dated October 18, 1938. This frame has been clearly indicated in Figs. 1 and 2 and is shown as provided with a central longitudinal beam 13 to which at least two transverse beams 14 and 15 are connected. The outer longitudinal edges of the floor plates 16 and 17 are preferably raised to form flanges 18 and 19 which contact the lower longitudinal edges of the vehicle body. It will thus be seen that in this construction for purposes of assembly the vehicle body may be considered as one unit, while the frame and floor form a separate integral unit.

Figure 4:
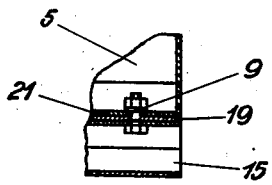
Fig. 4 is a cross-sectional view illustrating the connection between the body and frame, taken along the line IV—IV of Fig. 1.

As contrasted with prior constructions my vehicle body permits attachment to the transverse frame members 14 and 15 and more particularly at the points 6, 7, 8 and 9 which are along the bottom flanges 20 and 21 of the transverse walls 4 and 5. In order to facilitate ready attachment to and removal of the body from the frame the connection between the transverse walls 4 and 5 and the transverse frame members 14 and 15 is brought about by any readily releasable means known to the art, as screws or bolts, as illustrated in Fig. 4. Assembly and disassembly of the body and frame is accordingly extremely easy and quick.

The roof of the body extending from the windshield 10 back to the transverse wall 5 is self-supporting and contains no transverse bracing members. This roof, formed of pressed parts may be stiffened by providing therein stiffening grooves which are shaped to fit the streamlined contour of the roof. These stiffening grooves will perform another advantageous function, namely, the dampening and lessening of the vibration and resonance of the pressed material.

While as indicated in the accompanying drawing, the vehicle body is attached to the transverse frame members at only four points, obviously the attachment may be made at any desired number of points. It has been found that in certain instances a six point attachment is desirable.

Although as described above, the compartment 2 is adapted to contain the vehicle motor and the compartment 3 the baggage, my construction comprehends the use of a vehicle in which the engine is located forward and the baggage compartment in the rear. It is clear that such a change will not alter the principles of my construction.

As contrasted with known vehicle bodies in which a unitary passenger section only is formed with rims adapted to be attached at a multiplicity of places to the longitudinal frame beams, my hereinbefore described construction has a body comprehending the entire vehicle upper structure which is easy and quick of attachment. In addition, by fastening this improved body to the transverse frame beams, the twisting of the longitudinal beams will not detrimentally react upon the body portion.

While I have only described in this description a passenger vehicle formed according to my invention, it is wholly within the comprehension of the principles of my invention that other types of vehicle such as truck bodies can also be formed in a similar manner. In this case, it will be seen that one type of frame can be utilized for both types of vehicles and due to the readily releasable connection between the body and frame, a passenger vehicle for example, can with little difficulty and in a very short time be converted into a truck merely by the releasing of the body at a few points lifting the same off and placing upon the frame and connecting at said points the second body.

By forming a body in which the engine and baggage compartments are integral therewith, a saving of weight is effected as no additional members such as fastening means, braces, etc., need be added.

A further saving in weight is brought about by the use of the transverse stiffening partitions 4 and 5 which at the same time divide the vehicle body into the desired compartments. No other dividing or stiffening elements are necessary as is usual with vehicle bodies heretofore produced.

It will be seen therefore, that I have provided a device which fulfills the subjects primarily stated and while I have shown a single embodiment of my invention, it is clear that other forms thereof may readily be provided without departing from my invention as defined in the following claims.

I claim:

1. In a vehicle of the type having a frame consisting of at least one longitudinal beam connected with a plurality of transverse beams, and floor plates affixed to and forming a unit with said frame, the combination of a self-supporting vehicle body open at its bottom, and means for readily releasably connecting said body to at least two of said transverse frame members, said means forming the sole interconnection between said body and said frame.

2. The combination according to claim 1 in which said vehicle body includes a pair of integral transverse supporting members, said transverse members serving to partition said body into engine, baggage and passenger compartments.

3. The combination according to claim 1 in which said vehicle body includes a pair of integral transverse supporting members, said transverse members serving to partition said body into engine, baggage and passenger compartments, one of said transverse members being adapted to serve as a support for the base of a vehicle seat.

4. In a vehicle of the type having a frame consisting of at least one longitudinal beam interconnected with a plurality of transverse beams, and floor plates affixed to and forming a unit with said frame, the combination of a self-supporting vehicle body open at its bottom, a plurality of transverse supporting members in said vehicle body, and means for readily releasably connecting said transverse members to said transverse frame members, whereby said body is supported on said frame through said transverse walls.

5. The combination according to claim 4 in which said transverse supporting members are formed as partitions dividing said vehicle body into engine, baggage and passenger compartments.

6. In a vehicle, in combination, a frame consisting of at least one longitudinal beam and a plurality of transverse beams, floor plates integrally interconnected with said frame, a substantially hollow self-supporting vehicle body open at its bottom and having a pair of transverse walls, and means for releasably interconnecting said transverse walls with said transverse beam members, whereby said body is supported on said frame through said transverse walls.

7. The combination according to claim 1 in which said vehicle body includes a pair of integral transverse supporting members at least one of which serves to divide said body into distinct compartments.

8. The combination according to claim 1, in which said body covers the entire vehicle frame.

KARL RABE.